Figure 1:
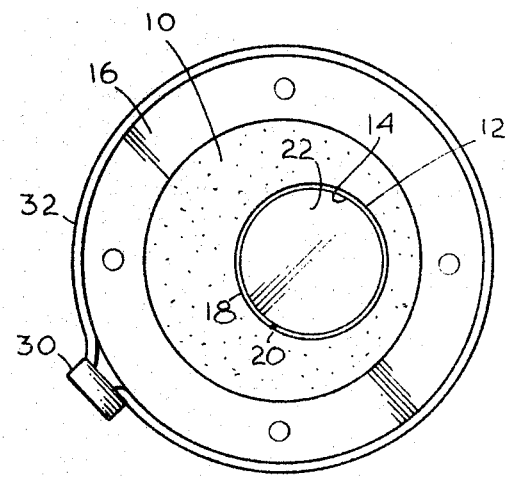

Aug. 9, 1966     L. A. LYLE, JR     3,265,798
PROCESS OF ISOSTATIC PRESSING OF CARBONACEOUS MATERIALS
Filed Oct. 31, 1962

INVENTOR.
LOWELL A. LYLE, JR.
BY
*Thaser and Bafucki*
ATTORNEYS

United States Patent Office 3,265,798
Patented August 9, 1966

3,265,798
PROCESS OF ISOSTATIC PRESSING OF
CARBONACEOUS MATERIALS
Lowell A. Lyle, Jr., Torrance, Calif., assignor to Hitco,
a corporation of California
Filed Oct. 31, 1962, Ser. No. 234,314
2 Claims. (Cl. 264—255)

The present invention relates to pressing and more particularly relates to an improved method of isostatic pressure molding and debulking and to improvements in apparatus for carrying out the method.

Various types of mechanical pressing techniques have been extensively employed in the fabrication and densification or debulking of products. Debulking is particularly important in the production of strong, low porosity refractory products for high temperature use, such as are required for certain missile and aircraft components. However, in some instances it has been found to be difficult to produce finished refractory articles which have required uniform density, dimensional stability and strength. Thus, when elongated dies or dies of relatively complicated shape are employed, it is usually difficult to uniformly distribute pressure to all parts of the material being mechanically pressed in the dies. Refractory articles thus unevenly densified tend to become dimensionally distorted during subsequent curing and firing operations carried out on the articles.

So-called isostatic pressing techniques have been devised in order to overcome the indicated difficulties with mechanical pressing. In carrying out a conventional isostatic pressing operation, a fluid medium is employed between the pressure source and the dies, the fluid medium acting to uniformly distribute the pressure applied to the dies, so that a product having relatively uniform density is obtained. Water, glycerne, hydraulic oils and various other fluids have been used as the fluid media. In a typical isostatic pressing operation, such as that successfully employed in the fabrication of certain refractory spark plugs, the material to be pressed is encased in a flexible sheath, the sheath in turn being disposed in the pressure-transferring fluid medium. The sheath comprises a deformable mold which is compressed around the material contained therein by means of hydrostatic pressure applied to the pressure-transferring fluid medium. The uniform pressure applied at all points to the exterior of the mold during such pressing results in the desired uniform densification of the material within the mold. Such uniformly densified products exhibit predeterminable small shrinkage without significant dimensional distortion during subsequent firing-curing operations.

However, even conventional isostatic pressing techniques are subject to certain drawbacks. In this regard, the set-up time for the pressing operation is usually of considerable length. Moreover, certain types of mechanical pressing equipment are not easily adapted for use in isostatic pressing operations. In addition, during the pressing operation rupture of the flexible sheath encasing the material to be molded or densified may occur, thus exposing the material inside the mold to the fluid medium. Depending upon the nature of the fluid medium and pressed material, and the temperature of each, damage to the latter may result. Flowing of the fluid medium from the apparatus at elevated pressure and temperature also represents a considerable safety hazard. In any event, when rupture of the sheath occurs, a considerable press break-down and clean-up period is required in order to place the pressing apparatus in reusable condition. A further difficulty is presented in selecting a fluid medium which is sufficiently thermally stable. Some otherwise suitable fluid media cannot be utilized at the high temperatures desired in the final press-curing of certain refractory products.

In view of the foregoing, it would be desirable to provide a safe reliable and rapid isostatic pressing method capable of operating at high pressures and high temperatures. It would be further desirable if such an isostatic method were capable of being carried out on conventional mechanical pressing equipment with relatively short set-up, break-down and clean-up times.

Accordingly, it is a primary object of the present invention to provide improvements in the production of uniformly densified products.

It is a further object of the present invention to provide an improved method of uniformly pressing materials at normal and elevated temperatures.

It is a further object of the present invention to provide a safe relatively rapid method of uniformly molding and debulking refractory and other products at normal and elevated temperatures with shortened set-up, break-down and clean-up times.

These and other objects are achieved, in accordance with the present invention, by utilizing an isostatic pressing technique in which the isostatic medium is a suitable readily pressure-deformable, incompressible, heat stable, solid elastomeric component having a high modulus of elasticity, which component is capable of uniformly distributing and transferring pressure to material to be pressed, so as to uniformly densify the same. The improved medium does not deleteriously affect refractory or other materials being pressed, is easy and safe to handle and is durable. No fluid medium is required in the isostatic pressing operations, so that set-up, break-down and clean-up times are reduced.

Figure 2:
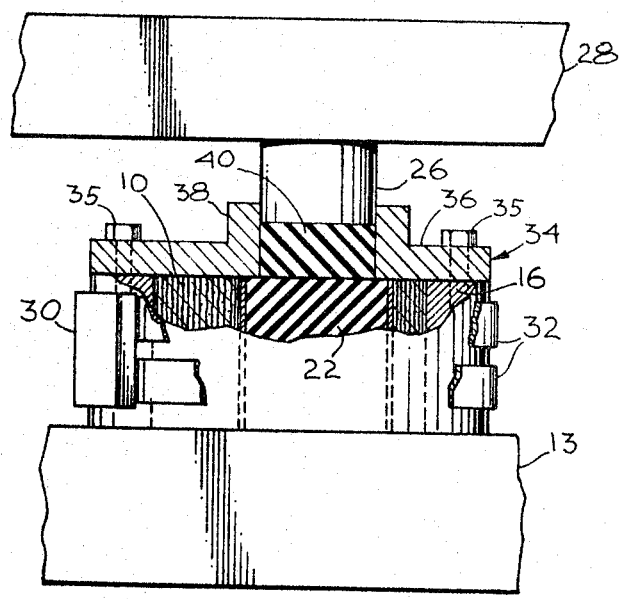

A better understanding of the invention may be had by reference to the following detailed descriptions and the accompanying drawings of which:

FIG. 1 is a schematic plan view of a portion of a pressing apparatus incorporating features of the present invention; and, FIG. 2 is a schematic side elevation of a typical pressing apparatus incorporating the components illustrated in FIG. 1.

In accordance with the present invention, isostatic pressing on a pre-formed article, such as a carbon or graphite billet, is accomplished by disposing the article to be pressed in a pressing zone adjacent a deformable, heat stable, incompressible, solid elastomeric component having a high modulus of elasticity, that is, a high elastic limit. Depending upon the configuration of the article, a rigid die component may also be utilized to provide a non-yielding backing component for the article. Pressure below said elastic limit is then applied directly to the elastomeric component, causing it to deform. As a result, the elastomeric component "flows" and is forced into closer contact with the material being pressed. Pressure transmitted to the elastomeric component is uniformly distributed therethrough and in turn uniformly distributed to the material being pressed, causing uniform debulking or densification thereof. The pressing operation can be maintained for any desired length of time at elevated pressure and at normal or elevated temperatures.

Now referring more particularly to FIG. 1 of the accompanying drawings, a portion of a pressing apparatus incorporating improvements in accordance with the present invention is schematically illustrated in plan view. As shown in FIGURES 1 and 2 a premolded refractory article, for example a carbon cylinder 10 having a cavity 14 extending therethrough, is supported on a solid base 13, such as steel or the like. A rigid female die 16 of steel or other suitable metal is disposed on the base 13 around the periphery of the cylinder 10 and acts as a backing component.

The cavity 12 of the carbon cylinder 10 is lined with a thin removable caul sheet 18 which is smooth surfaced and readily expandable. The caul sheet 18 can be fabricated in the form of, for example, a hollow aluminum, brass or steel cylinder having a longitudinally extending expansion gap 20 or slit therein. Alternatively the caul sheet may have the ends thereof lapped over to cover what would be gap 20 so that as the diameter of caul sheet 18 increases no gap appears therein. The caul sheet 18 is utilized to impart a smooth surface to the article during pressing. For certain purposes, such smooth surface may not be necessary or desirable. In such instances, the caul sheet can be eliminated from the assembly. When the solid elastomeric component in accordance with the present invention is in direct contact with the article being pressed, the elastomeric component imparts a matte or textured finish to the article, particularly suitable for certain applications.

As shown in FIG. 1, an elastomeric component 22 in the form of a solid cylindrical plug or male die component and fabricated of a readily pressure-formable, heat stable, incompressible solid elastomer fills the cavity defined by the caul sheet 18.

Such rubber elastomers are selected to resist setting to an inelastic state and other deterioration under high pressure at elevated temperatures contemplated for the pressing operation. The elastomer preferably has a shore hardness of about 50 to about 60. Several suitable synthetic rubber elastomers are commercially available. One of such elastomers is neoprene. A second suitable rubber elastomer for use in the fabrication of the present elastomeric component is Paracril.

Neoprene is a chloroprene type rubber and comprises polymerized 2-chloro-1,2-butadiene. Antioxidants such as the reaction product of diphenylamine and diisobutylene may be added in 1–4 parts per 100 parts of the rubber in order to increase resistance of the rubber to aging at elevated temperature.

Paracril is the U.S. registered trademark of the Naugatuck Chemical Division of U.S. Rubber Co. for nitrile rubber of the Buna N-type characterized by resistance to aging at high temperature. It is resistant to swelling in oils, fats and petroleum hydrocarbons and is compatible with natural and synthetic rubbers and with vinyl and phenolic resins. It is produced by copolymerization of butadiene and acrylonitrile.

A third suitable type of heat resistant rubber is known as butyl rubber. It is copolymerized isobutylene and diolefins. In general, heat resistant synthetic rubbers employ low sulfur content vulcanization systems, and have antioxidants added thereto, for example octamine. They also may include polymeric plasticizers and inorganic fillers.

It will be understood that other solid rubber elastomers can be utilized in addition to or in place of the indicated heat resistant synthetic rubber elastomers so long as they are readily pressure-deformable and incompressible, and have sufficiently high heat stability, high elastic limits and suitable Shore hardness. Shore hardness is the height of rebound of a diamond-pointed hammer falling under gravity on an object. It is measured on an empirical scale with high-carbon steel taken as 100.

The plug 22 may extend, as shown in FIG. 2, from the bottom of cylinder 10 (abutting base 13) to about the level of the upper surface thereof. A loading chamber 34 fabricated of steel or the like is releasably secured to the upper surface of die 16, as by threaded bolts 35. The chamber 34 comprises a horizontally extending peripheral portion 36 disposed on the top of die 16 and carbon piece 10 and a centrally positioned, vertically extending, hollow, cylindrical portion 38 adapted to receive a second rubber plug 40 of similar material to plug 22 and a pressure means, such as the central depending plunger 26 of a hydraulic ram 28 disposed above cylinder 10, as shown in FIG. 2. Plug 40 sits on plug 22. Additional rubber is thereby provided to compensate for an increase in the volume of the cavity 12 in the cylinder 10 during pressing.

Referring again to FIG. 1, suitable heating means 30 in the form of electrical resistance or induction heating coils 32 are disposed around the exterior of the female die component 16 to regulate the temperature of cylinder 10 during pressing. Steam coils or other suitable heating means can be used in place of electrical heating coils 32. If pressing is to be carried out at ambient temperature, coils 32 can be eliminated.

The isostatic pressing operations in accordance with the present invention can be carried out at any suitable pressure below the elastic limit of the elastomeric component. Typical pressures successfully employed have been in the 1000 to 1800 p.s.i. range. However, much higher pressures can also be utilized. Temperatures can also vary from ambient temperature to well over 300° F. In fact, the pressures and temperatures are only limited by the particular material being processed, the desired characteristics to be imparted to the material and the particular solid elastomeric component employed. The described elastomers are capable of withstanding pressure considerably exceeding 1800 p.s.i. at temperatures in excess of 300° F.

In utilizing an isostatic pressing apparatus such as that schematically illustrated in FIGS. 1 and 2 of the accompanying drawings in accordance with the present invention, the cylinder 10 can be disposed on the base 13 and within the rigid female die component 16. The caul sheet 18 can then be inserted and the elastomeric plug 22 fitted into place. Then loading chamber 34 can then be placed over the die 16 and cylinder 10 and secured in place by bolts 35. The second plug 40 can then be inserted in the loading chamber, after which the plunger 26 of the hydraulic ram 28 is run down into the chamber 34 to contact plug 40. Pressure is then applied by the plunger 26 to the plug 40 and plug 22. The workpiece 10 can be heated to desired operating temperature by heating coils 32 before or during application of pressure to the plugs.

Since the bottom of the plug 22 rests against the immovable base 13 and the plugs 22 and 40 fill the cavity 12 in the workpiece and since these plugs are essentially incompressible, pressure exerted downwardly by the hydraulic plunger 26 on plugs 22 and 40 causes the plugs to deform radially, exerting a uniform pressure in all directions radially outwardly therefrom. This pressure is transferred through the plugs 22 and 40 to the workpiece 10, the plugs uniformly pressing against the walls defining cavity 12 or against the caul sheet 18 (if interposed between the plug 22 and the cavity walls 12). The workpiece 10 is forced tightly against the inner surface of the steel female die 16 and is rapidly debulked i.e. densified.

It will be understood that in pressing a refractory workpiece which is easily broken, for example, carbon or graphite, it is extremely important to maintain uniform pressure thereon. Thus, the present method and apparatus effectively achieve the desired results through the use of the elastomeric plugs in the described manner. The pressing operation is continued until the desired densification or debulking of the workpiece 10 is accomplished, after which the pressure applied by the hydraulic ram 28 is released by moving the plunger 26 upwardly out of contact with plug 40, plugs 22 and 40 then returning to an undeformed condition. The chamber 34, plug 40, plug 22, caul sheet 18 and workpiece 10 can then be easily removed from the pressing apparatus. The components of the pressing apparatus are in a dry, readily reassemblable condition for further use in pressing workpieces.

The following example further illustrates certain features of the present invention:

EXAMPLE

The described isostatic pressing operation was carried out on 16 carbon billets each of which was in the form of a hollow cylinder having an eccentric cavity extending therethrough. Each carbon cylinder was prepared in the following manner:

Carbon cloth, prepared substantially as set forth in U.S. patent application, Serial Number 160,605, filed December 19, 1961, entitled, Process for Preparing Carbon Fibers, of which Richard B. Millington and Robert C. Nordberg are the inventors, was impregnated with phenolic resin and utilized in building up the carbon cylinders in primary molded form.

The carbon cloth had been prepared by washing rayon fabric in a detergent solution to remove finishing materials therefrom to below about 0.25% ether extractables, then rinsing the fabric free of the finishing materials and detergent solution, drying the fabric and then heating the dried fabric in skein form in a series of controlled heating steps, each step lasting in excess of about 12 hours and being of about 20° to 50° F. higher than the previous step, with the temperature of the initial step being about 360° F. and the temperature of the final step about 700° F. During the carbon fabric formation excess water was driven off and intermediate levoglucosan products and ultimately carbonaceous chars and volatile tars were formed. The carbonaceous chars constituted non-graphitic, that is amorphous, carbon fibers. After the heat treatment the carbon fiber fabric was cooled to below 300° F. and then flash fired at approximately 2200° F. for a period of about ten seconds, cooled by quenching in water and ultimately dried.

As previously indicated, the fabric was formed into each of two components dimensioned for nesting together to form a carbon cylinder with phenolic resin acting as the bonding means for layers of the fabric. The resin also impregnated the interstices of the fabric.

A mandrel placed in a suitable position on a lathe was utilized for initially forming each of the two components (the inner and outer components) for each cylinder. The mandrel was first wrapped tightly with cellophane tape which acted as a release agent for the component. Scotch tape was then wrapped over the cellophane tape to hold it into place. Guide lines were then placed thereover using glass tape spaced about six inches apart, the glass tape being ½ inch wide and pressure sensitive. Carbon cloth cut on a 45° bias to widths of 5.75 inches was used. The initial strip of carbon cloth was tacked with masking tape to the covered surface of the mandrel and was then wrapped around the mandrel against a roller pressure of about 1000 p.s.i. at a turn speed of about 2 r.p.m., a heat gun being adjusted to simultaneously heat both the roller and the carbon cloth material being wrapped. The material was wrapped in such a manner that it was essentially free of slacks and wrinkles. Consecutive strips of the carbon cloth were butt jointed as closely as possible to avoid overlaps. The end of the second piece of carbon cloth material was heated under the heat gun to cause it to firmly adhere to the adjoining surface of the first strip of carbon cloth material already placed on the mandrel. The described wrapping operation was interrupted at about every 0.25 inch of thickness of wrap at the end of the desired carbon cloth strip, and the heat gun was removed at that point and rolling was continued under the 1000 p.s.i. pressure for about five minutes to firmly adhere the cloth to itself on the mandrel. Between the pressure-rolling steps, successive strips of the carbon cloth material were wound around the mandrel. Accordingly, the inner component was built up to an outer diameter of about 10.5 inches, after which the inner component and mandrel were removed from the lathe and machined to provide an overall length of five inches and an outer diameter of 10.5 inches. The mandrel was then removed from the inner component and an eccentric hole was drilled through the carbon component to a 5.75 inch diameter.

The outer component of each carbon billet was then prepared in identical manner except that the outer diameter thereof was 14.625 inches. The outer component was machined to a total length of 5.0 inches.

The inner component was then debulked in an apparatus substantially as shown in the accompanying figures and as previously described. The apparatus included an expandable caul sheet having a diameter of 5.75 inches and a length of 4.95 inches and which was fabricated of 0.06 inch thick steel tubing. A neoprene rubber plug having about the same diameter and length as the caul sheet was inserted inside the caul sheet, the plug having a Shore hardness of 50–60. The loading chamber was then fixed into place on the top of the female die, inner component, caul sheet and plug. A 5 inch by 3½ inch long cylindrical second neoprene rubber plug was placed in the neck of the loading chamber and the unit was secured in a hydraulic press having a plunger which was orientated to extend down into the neck of the loading chamber above the second rubber plug.

Debulking was then carried out by first heating the inner component to 160° F. and then applying pressure by means of the plunger in 200 p.s.i. increments to a maximum of 1500 p.s.i. within about fifteen minutes. The component was held at 1500 p.s.i. and 160° F. for one hour and then air cooled under 1500 p.s.i. to 90–100° F., after which the pressure was gradually relieved at a maximum rate of 300 p.s.i. per minute. The apparatus was then disassembled and the debulked inner component was removed for machining.

The second or outer component of each carbon billet was then subjected to an identical debulking operation utilizing, however, a caul sheet having a 9 inch diameter by 4.95 inch length and a first rubber plug having the same diameter and length and the second rubber plug having the same diameter and a length of about 3 inches. After the debulking operation on the other component of each carbon billet, it was removed from the apparatus for machining.

The inner component of the carbon billet was then machined until it just fit into the cavity in the second component. After debulking, the cavity of the outer component was approximately 9.5 inches in diameter. The inner component was then inserted in the cavity in the outer component and the two components were pressed together until a contact fit was obtained therebetween.

The thus formed billet was then machined to a length of 4.5 inches and subjected to a curing operation. Initial curing was carried out in apparatus and at temperatures, pressures and times substantially as set forth for the initial debulking operations on the inner and outer components of the carbon billet. Thereafter, the carbon billet was further cured in the same apparatus by applying thereto a pressure of 500–510 p.s.i. at a temperature of 150–175° F. for 0.5–0.6 hour. The temperature was then held constant while the pressure was increased in 200 p.s.i. increments at five minute intervals until a maximum of 1500 p.s.i. was reached. The temperature was then increased to 275° F. while holding the pressure constant at 1500 p.s.i. The dwell time at 1500 p.s.i. and 275° F. was one hour. The cured carbon billet was then air cooled to 90–100° F. at 1500 p.s.i. Thereafter, the pressure was decreased in increments of about 200 p.s.i. at five minute intervals. The finished carbon billet was then removed from the apparatus and inspected.

It was found to be unitary in structure, the inner and outer components thereof being tightly bonded together, and it was found to have been increased in specific gravity to between about 1.40 and about 1.53, representing a weight increase to between about 93 and 94 pounds per cubic foot. Each carbon billet was found to be strong, crack-free and of uniformly high density and low porosity. Moreover, each billet was dimensionally accurate i.e. exhibited no substantial warpage or other dimensional distortions.

The described isostatic pressing and curing was completed on all sixteen billets without accident or breakdown of the billets or the apparatus. Moreover, it was found that the neoprene plugs could be used on as many as five or more carbon components before requiring replacement. Furthermore, it was found that other suitable rubber elastomeric plugs could be substituted for the neoprene plugs, particularly butyl rubber plugs having the requisite characteristics, including a Shore hardness of 50-60. The isostatic pressing and curing was found to be simple, safe and effective and resulted in a rapid production of high quality carbon billets in finished form.

The method of the present invention and the apparatus for carrying out the method are equally applicable to single-stage and multi-stage operations on unformed material or pre-formed articles, whether of a refractory nature or not. However, as previously indicated, the method and apparatus are particularly suitable for use in the densification of refractories, including relatively fragile solid refractories, such as carbon and graphite, and refractories fabricated of resin-impregnated carbon cloth and the like. The method and apparatus can also be used to combine into a composite product a plurality of separately pre-formed articles. Various refractory treatment stages can be carried out with the method and apparatus, including initial molding, debulking and final press-curing.

It will be understood that the described improvements in the isostatic pressing apparatus are not limited to the use of the elastomeric component in the form of a plug or male die component. In this regard, the elastomeric component could, for example, be fabricated in the form of a female die or mold of any desired shape or size. Other applications of the elastomeric component are also possible. In any event, such component should be utilized in accordance with the present invention, as the means whereby pressure is uniformly distributed and transferred to the material to be pressed.

One important advantage in utilizing a solid elastomeric component is that the contour thereof can be readily adjusted, as by cutting, filing, molding or the like, to conform to the requirements of a particular pressing operation. Moreover, such elastomeric component can be readily incorporated into standard mechanical pressing equipment to produce the desired isostatic pressing equipment. Since the elastomeric component uniformly and readily deforms or "flows" it is capable of conforming under pressure to the shape of a pre-molded workpiece to be pressed.

While there have been described various aspects of the present invention relating to isostatically pressing materials such as refractories to provide uniformly densified products, it will be appreciated that varoius modifications, variations and alternative forms of the method of the present invention and the improvements in apparatus for carrying out the method are also within the scope of the present invention. Accordingly, the invention should not be considered to be limited by the foregoing description but should be taken to include those methods, apparatus, and products which fall within the scope of the appended claims.

What is claimed is:
1. An improved isostatic pressing method for uniformly debulking a concentrically wound carbon cloth article, which method comprises the steps of disposing a molded refractory carbon article comprising concentrically wound resin-impregnated carbon cloth having a cavity extending therethrough and positioned within the outer periphery thereof in a pressing zone against a rigid female die component, inserting a pressure-deformable heat stable solid elastomeric male die component within said cavity to fill the same, applying non-uniform pressure to and deforming said elastomeric male die below the elastic limit thereof so as to force said elastomeric male die component into closer contact with said article, uniformly distributing and transferring said pressure in said elastomeric component to said article while maintaining said article at an elevated temperature and maintaining said pressure and temperature until desired debulking of said article is effected, repeating said pressing operation on a second complementary carbon cloth article so as to debulk the same, and joining said first and second articles together, increasing said temperature and pressing the combined first and second articles in substantially the same manner as in said debulking operation until said resin is cured and until said first and second articles are permanently joined together.

2. The method in accordance with claim 1 wherein said debulking of said first and second articles is carried out at about 150° F. and at a pressure of about 1500 p.s.i., wherein said first and second articles are joined together by pressing at about 1500 p.s.i. and at a temperature of about 275° F., and wherein said resin comprises a phenolic resin and said elastomer is a synthetic rubber elastomer heat stable to above about 300° F.

References Cited by the Examiner
UNITED STATES PATENTS

| | | | |
|---|---|---|---|
| 881,644 | 5/1908 | Winne | 264—313 |
| 1,656,169 | 11/1925 | Swartz | 156—326 |
| 2,091,973 | 9/1937 | Fessler. | |
| 2,558,823 | 7/1951 | Crowley. | |
| 2,648,620 | 8/1953 | Hole | 156—325 |
| 2,893,062 | 7/1959 | Penrice. | |
| 2,941,243 | 6/1960 | Bundy. | |
| 3,061,873 | 11/1962 | Supitilov | 264—315 |
| 3,084,394 | 4/1963 | Bickendike | 18—54.7 |
| 3,092,437 | 6/1963 | Carter | 18—54.7 |

ROBERT F. WHITE, *Primary Examiner.*

ALEXANDER H. BRODMERKEL, R. B. MOFFITT,
*Examiners.*